UNITED STATES PATENT OFFICE.

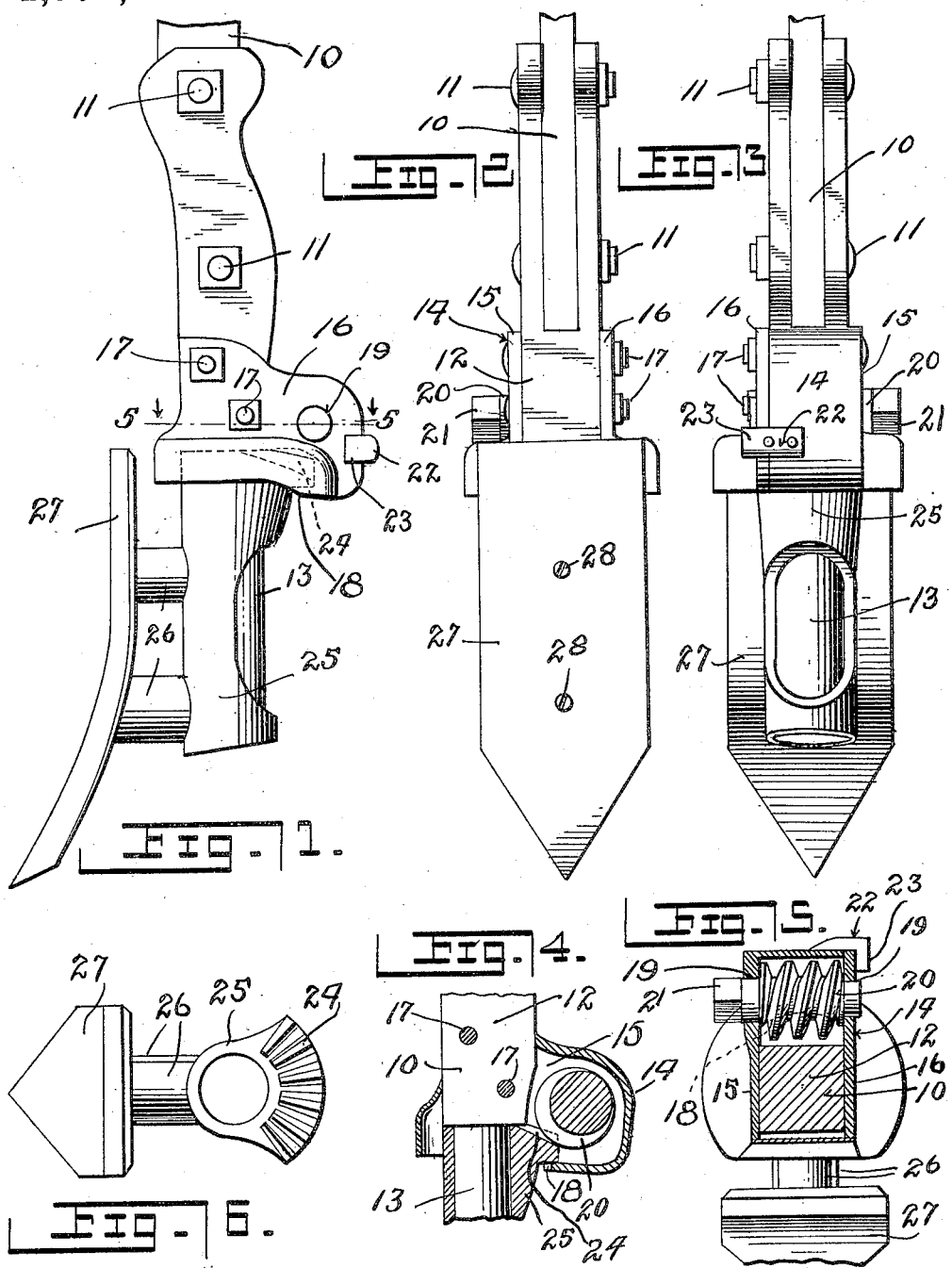

WALTER O. CREEK, OF ARCADIA, INDIANA.

ATTACHMENT FOR RIDING-CULTIVATORS.

1,075,092. Specification of Letters Patent. Patented Oct. 7, 1913.

Application filed December 27, 1912. Serial No. 738,918.

*To all whom it may concern:*

Be it known that I, WALTER O. CREEK, a citizen of the United States, residing at Arcadia, in the county of Hamilton, State of Indiana, have invented certain new and useful Improvements in Attachments for Riding-Cultivators; and I do hereby declare the following to be a full, clear, and exact description of the invention, such as will enable others skilled in the art to which it appertains to make and use the same.

This invention relates to cultivators and more particularly to an attachment for riding cultivators, whereby the shovel may be adjusted in the desired angular position relative to the shovel standard and holder therefor so as to engage the ground surface and throw the dirt at the proper angle.

The invention resides more particularly in an improved standard construction and means for rotating the standard and shovel carried thereby to adjust the shovel in the desired angular position.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 1 is a side elevation of a cultivator standard constructed in accordance with the invention. Fig. 2 is a front elevation thereof. Fig. 3 is a rear elevation of the device. Fig. 4 is a vertical sectional view with certain of the parts in elevation. Fig. 5 is a horizontal sectional view on the line 5—5 of Fig. 1. Fig. 6 is a top plan view of the shovel and its attaching part.

In illustrating the preferred embodiment of the invention, there is shown the usual attaching part 10 of a cultivator standard which is adapted for removable attachment by bolts 11, as shown, such bolts being engaged through the spaced portions of the attaching part. In my form of the invention, the foot 12 of the attaching part is provided with a depending standard or stem 13 of circular cross section, the base portion being of rectangular cross section. Secured to one side of the foot of the device is a casing 14, the same having one side formed with an integral plate 15 and having its open side closed by a removable plate 16. These plates are engaged with the opposed side faces of the base and removably secured thereto, as by means of bolts 17 extending through alined openings in the base and plates respectively. The top, rear and bottom portions of the casing are closed, being preferably of convexed formation and the bottom portion is arcuately cut in concaved form as shown at 18, substantially concentric to the center of the standard 13.

The plate or side wall 15 and the removable plate 16 are provided with opposed bearing apertures 19 receiving the spindle ends of a worm shaft 20, such shaft having a squared end 21 projecting from the side opposite to which the removable plate is secured. This squared portion is adapted for the application of a wrench or other tool for rotating the worm gear or shaft. The removable plate is held in position in conjunction with the bolts 17 by an angular catch 22 which is preferably secured or formed with the casing and provided with an overhanging lip 23 engaging the rear portion of said plate, thus holding it against outward displacement or binding contact with the spindle or journal ends of the shaft. It will further appear that by disposing the wrench head of the shaft at the side of the casing opposed to the side at which the catch is disposed, as well as the removable plate, such catch will not interfere with the placing of the wrench. It will also be observed that the opposed plates at their lower edges are under-cut forwardly to a point in rear of the bottom of the casing, the purpose of this being to accommodate a horizontally disposed segmental rack gear 24 formed at the enlarged upper end of a supporting part or cylinder 25 to which the shovel is attached. This cylinder or circular casing is rotatably mounted on the stem of the standard and its rear portion is cut away to lighten the structure, while the segmental gear is supported on the bottom portion of the casing and in mesh with the worm shaft. A crowning joint is formed between the base 12 and the upper end of the supporting part 25 so as to prevent the entrance of soil and grit between the parts thus brought to bear one upon the other. The supporting part or casing 25 is formed with integral forwardly extending studs 26 which serve for the attachment of the shovel 27 as shown at 28. The design of the shovel may be varied at will.

In the use of the device, it is at times desired to direct the shovel toward the right or left or centrally and in order to dispose the same at different angular adjustments, a wrench or tool is applied to the wrench head or squared portion of the worm shaft whereby it may be rotated. As a result, rotation of the worm gear in mesh with the segmental gear of the supporting part or casing, will shift the shovel to the right or left according to the direction in which the worm shaft is rotated and the friction between the parts is such as to hold the shovel against movement when in use.

What is claimed:

1. The combination with spaced attaching members having a base portion and a depending stem of circular cross section; of a casing carried by the base and having an under-cut part, a worm shaft journaled in the casing, a sleeve mounted on the stem and provided with a gear in mesh with the worm shaft and implement member carried by the sleeve.

2. A riding cultivator standard including its attaching member having a base portion and a stem, a casing removably attached to the base portion and having side walls, one of said walls being removable, a worm gear journaled in said walls, a sleeve mounted on the stem and having a projecting gear supported in the casing and in mesh with the worm gear and a shovel removably secured to the sleeve.

In testimony whereof, I affix my signature, in the presence of two witnesses.

WALTER O. CREEK.

Witnesses:
THOS. W. CREEK,
JOHN A. HEISSER.